US012524823B1

(12) United States Patent
Astwood et al.

(10) Patent No.: US 12,524,823 B1
(45) Date of Patent: Jan. 13, 2026

(54) AUTHENTICATION SYSTEMS AND METHODS FOR EMERGENCY RESOURCE PROVISIONING

(71) Applicant: UIPCO, LLC, San Antonio, TX (US)

(72) Inventors: Paul Joseph Astwood, San Antonio, TX (US); Steven Michael Bernstein, San Antonio, TX (US); Janell Guzman, Boerne, TX (US); Gregory David Hansen, Fuquay Varina, NC (US); Nina Schuessler, San Antonio, TX (US); Kristina Suniga-Cabrera, San Antonio, TX (US); Mounica Urity, Mountain View, CA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/788,734

(22) Filed: Jul. 30, 2024

Related U.S. Application Data

(60) Provisional application No. 63/516,621, filed on Jul. 31, 2023.

(51) Int. Cl.
*G06Q 50/26* (2024.01)
*G06F 21/10* (2013.01)

(52) U.S. Cl.
CPC ....... *G06Q 50/265* (2013.01); *G06F 21/1014* (2023.08)

(58) Field of Classification Search
CPC .......................... G06Q 50/265; G06F 21/1014
USPC .......................................................... 235/381
See application file for complete search history.

(56) References Cited

U.S. PATENT DOCUMENTS

| | | | |
|---|---|---|---|
| 2015/0186840 A1* | 7/2015 | Torres | A47B 81/00 705/339 |
| 2020/0213446 A1* | 7/2020 | Hardy | G06Q 30/016 |
| 2021/0049846 A1* | 2/2021 | Kashi | G07C 9/00912 |
| 2022/0181887 A1* | 6/2022 | Baldasare | G07C 9/00912 |
| 2024/0013599 A1* | 1/2024 | Chan | G07C 9/27 |

* cited by examiner

*Primary Examiner* — Daniel St Cyr
*Assistant Examiner* — David Tardif
(74) *Attorney, Agent, or Firm* — Plumsea Law Group, LLC

(57) ABSTRACT

A method and system for managing and providing emergency access to one or more secured resources including a replacement mobile phone, credit card, and cash. The embodiments provide a system that authenticates users based on presentation of a pre-registered tracking device. Authentication can be performed by a physical kiosk stationed in a building or outside. In one example, the system can read the identifier data provided by the tracking device and trigger an automated dispensing of the secured resource. In the case where a new mobile phone is provided to the user, a personalization process can be implemented in which the new phone is automatically pre-configured for the user's individual experience by importing the user's stored personalization data and preferences.

20 Claims, 10 Drawing Sheets

AUTHENTICATION SYSTEMS AND METHODS FOR EMERGENCY RESOURCE PROVISIONING

TECHNICAL FIELD

The present disclosure generally relates to providing access to essential resources during an emergency, and in particular to a mechanism by which to access a mobile device and/or funds in different locations using a physical token-based authentication of the user.

CROSS-REFERENCE TO RELATED APPLICATION

This application claims the benefit of U.S. Provisional Patent Application Ser. No. 63/516,621 filed on Jul. 31, 2023 and titled "Authentication Systems and Methods for Emergency Resource Provisioning", the disclosure of which is incorporated by reference herein in its entirety.

BACKGROUND

Credit cards and debit cards, as well as identification cards and other personal items, are sometimes lost or stolen. Furthermore, in scenarios where a person is in away from their home, it can be difficult to pull together the resources needed to accommodate the loss. In some cases, cellular phones or other communication devices can also be lost or stolen, leaving the person vulnerable and unable to reach loved ones, particularly in today's cell phone-dependent society. Replacing such items or simply being able to access sufficient resources to return home without their identification or money becomes a difficult challenge.

There is a need in the art for a system and method that addresses the shortcomings discussed above.

SUMMARY

In one aspect, a computer-implemented method of providing emergency access to a secured resource is disclosed. The method includes a first step of receiving, via a scanner at a locker kiosk, identifier data from a tracking device and a second step of determining, at an access manager module, the identifier data corresponds to a first user identity. In addition, a third step includes dispensing, via the locker kiosk and in response to determining the identifier data corresponds to the first user identity, a first mobile computing device. The method also includes a fourth step of automatically transferring over a network, from a remote server and to the first mobile computing device, and in response to dispensing the first mobile computing device, user personalization data for the first user identity, thereby configuring the first mobile computing device for use by the first user identity.

In another aspect, a computer-implemented method of providing emergency access to a secured resource can include a first step of receiving at a first time, via a scanner at a locker kiosk, identifier data from a tracking device, and a second step of determining, at an access manager module, the identifier data corresponds to a first user identity. The method can also include a third step of receiving, at the locker kiosk, a first authentication factor, and a fourth step of verifying, at the access manager module, that the first authentication factor matches a second authentication factor linked to the first user identity. A fifth step can include dispensing, via the locker kiosk and in response to determining the identifier data corresponds to the first user identity and the first authentication factor matches the second authentication factor, a first mobile computing device.

In another aspect, a system for providing emergency access to a secured resource is disclosed. The system comprises a processor and machine-readable media including instructions which, when executed by the processor, cause the processor to (1) receive, via a scanner at a locker kiosk, identifier data from a tracking device; (2) determine, at an access manager module, the identifier data corresponds to a first user identity; (3) dispense, via the locker kiosk and in response to determining the identifier data corresponds to the first user identity, a first mobile computing device; and (4) automatically transfer over a network, from a remote server and to the first mobile computing device, and in response to dispensing the first mobile computing device, user personalization data for the first user identity, thereby configuring the first mobile computing device for use by the first user identity.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
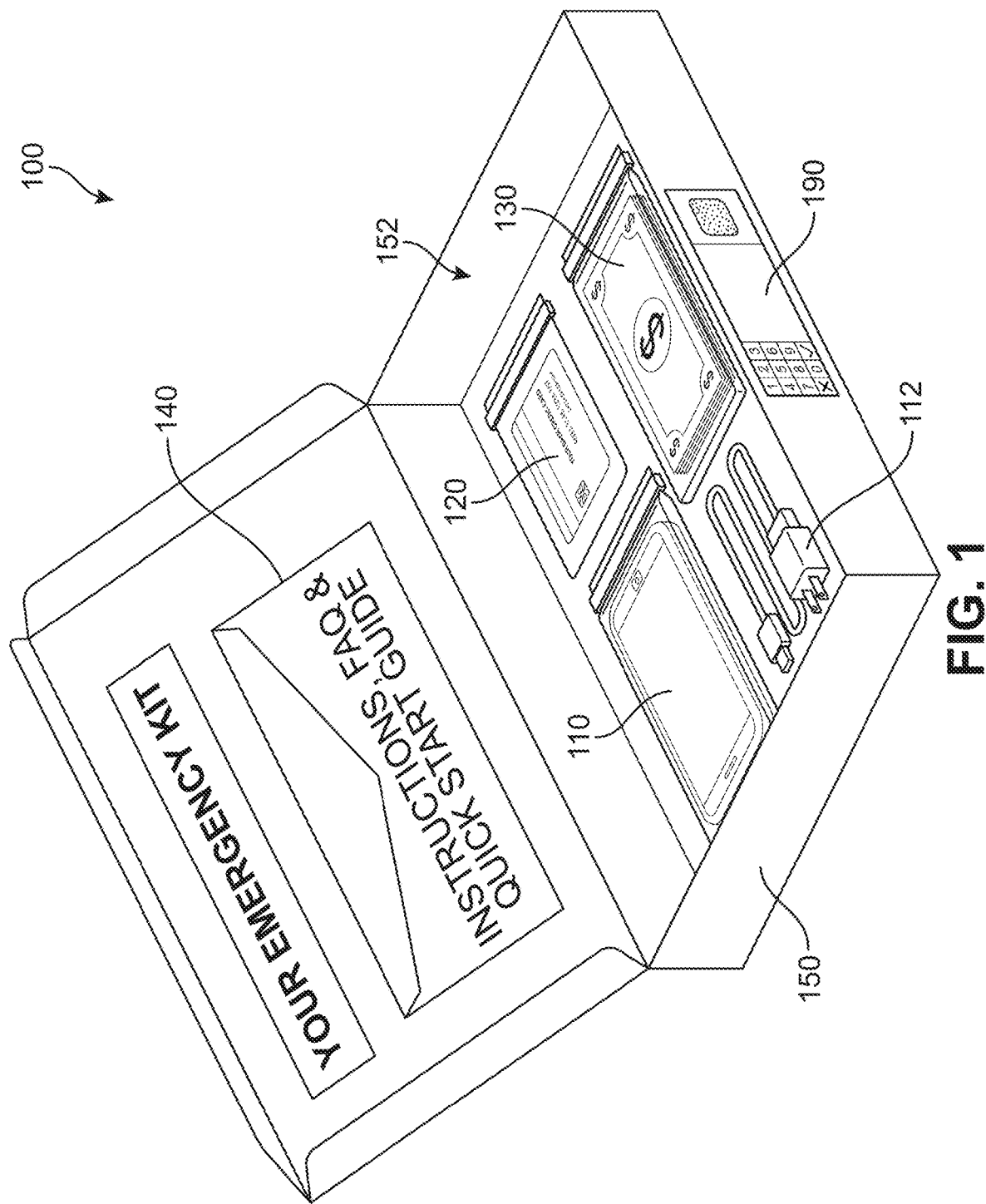
FIG. 1 depicts an example of an emergency resources kit that includes a replacement mobile computing device, a credit card, and cash, according to an embodiment.

The proposed embodiments describe a system and method for providing users a mechanism by which to obtain emergency provisions at secured local stations or kiosks. In one example, a service provider can store or pre-place blank emergency phones or emergency kits in multiple locations throughout popular travel destinations. These kits can be pre-placed in secure lockers or kiosks that are based in different indoor and outdoor locations. In another example, the access to emergency kits can also be managed or regulated by trusted parties, such as police stations, libraries, or hotels. Users can then obtain one of these emergency kits by providing sufficient authentication information.

In one embodiment, a device can be obtained by the user that will facilitate the authentication process. In some cases, the device can include one of a Bluetooth tracker or GPS tracker, NFC (Near Field Communication), internet of things (IoT) device, and/or ultrawide band (UWB) based tracking device, tag, or token that comprises a small electronic chip, an antenna, and a battery. Upon arrival at one of the locker stations, the user could present the tracking device to the locker. The locker could authenticate the user in response to the presentation of the token, in some cases along with some additional code. Once authentication is successfully performed, the locker could automatically unlock one of the locker doors containing an emergency kit. In the case of a hotel, police station, library, or other trusted institutional or retail location, the helpdesk or front desk could have a reader for the tracking device. Once authenticated, the on-site staff can be trained to hand the member an emergency kit.

In different embodiments, an emergency kit can include one or more of: (1) a small amount of emergency cash, (2) a blank loaner phone, and/or (3) a blank credit card. In some embodiments, the user's unique tracking device can then be used to personalize and revive contents of their lost/stolen phone onto the new loaner phone. For example, the tracking device may be used as a trigger that can be 'touched' to the back of the phone or somehow communicate with the phone using a wireless or wired connection. The phone can be configured to register the presence of the tag and recognize based on the specified input that a personalization process should be initiated that will configure the phone for the user's preferences. This process can facilitate the transfer of essential user data to the new phone. For example, the phone can then retrieve all of the user's pre-authorized data and settings from a host server, cloud storage or other network attached service. The retrieved settings and data information can then be used to personalize the blank phone so it mimics, in some ways, the member's lost phone. For example, the following features and items may be imported onto the new phone: contacts, payment apps and settings, travel apps, messaging apps, and other settings.

In some embodiments, once the new loaner phone has been configured, it should provide useful functions, like the ability to tap and pay, and use travel and rideshare apps like Uber and Lyft, without further authentication. The import process is intended to work so that the user is able to access their previously installed apps and payment details without additional inputs or identification. In one example, the new phone can be configured to operate like the user's lost phone seamlessly. In some optional embodiments, once the personalization process has been performed, the system can automatically generate a signal that causes a disabling of the lost phone. In other words, in some embodiments, the act of configuring a new loaner phone for use by the member automatically disables the lost phone. All of the accounts and rights on the lost phone can be deleted, locked, or the authorizations are withdrawn. In other words, none of the financial or payment features of the lost phone will work once the new phone is activated. In some embodiments, if the lost phone is recovered, the user can request reactivation or restoration of the account by presenting the recovered phone to an authorized/trusted service provider with their identification or other authorization code/information.

For purposes of introduction, an overview of one embodiment of the proposed systems and methods is illustrated with reference to FIG. 1. FIG. 1 depicts an example of an emergency provisions kit ("kit") 100. For purposes of this example, a plurality of items is included and stowed in an interior space 152 of a container 150. The items include a blank or otherwise unregistered mobile computing device 110, a credit card 120, cash 130, and an optional device charger/communication cable or adaptor 112 (e.g., Lighting® cable, USB, micro-USB, Type-C, etc.), as well as optional hard-copy instructions/guide 140.

In different embodiments, container 150 may include various optional mechanisms and systems for accessing and/or securing the components or other contents stored in its interior 152 beyond that of the locker housing and/or trusted service provider access regulation. For example, an optional secured access system 190 can be configured to communicate and/or respond to, for example, signals emitted by near field communication (NFC) technology via an onboard proximity sensor, for example, or another input mechanism (e.g., an interactive display or keypad) for receiving input from a user to verify his or her identity or authority to access the container 150, by, for example, entering a PIN or a VIP code that may be known to the user and is linked to their token. In some embodiments, an interactive display may issue these instructions visibly on display. The container 150 may alternatively issue these instructions audibly via a speaker incorporated into the container housing. The user's identity may also or alternatively be verified by biometric scanner mounted along an exterior of the container 150, which could include, for example, using facial recognition based upon the user's facial features, voice recognition based upon a voiceprint of the user, a retinal scan and/or fingerprint identification. In other embodiments, a physical locking and unlocking mechanism such as a fingerprint scanner and/or a keypad may be included to allow for secure access to the package contents. In some embodiments, once the container has been opened and the contents retrieved, the user can return their container 150 to the locker or trusted personnel, where it can be re-filled and re-used.

Furthermore, it should be understood that embodiments are not limited to the particular size and shape of container 150. In other embodiments, other types of containers could be used. For example, a container can include a bag, soft sided or hard-shell sided container, box, parcel, or other item such as shoulder bag containers, hand-held containers, duffle bag containers, rolling containers, compactable containers, as well as others. Thus, any protective housing that can be shipped and securely hold the recording system (electronics, battery, and computing device) can be used. In other embodiments, there may be no container 150 provided, and the user can access the contents (e.g., mobile computing device 110, credit card 120, cash 130, and device charger/communication cable or adaptor 112) directly from the locker housing or simply handed to the user by on-site staff.

Figure 2A:
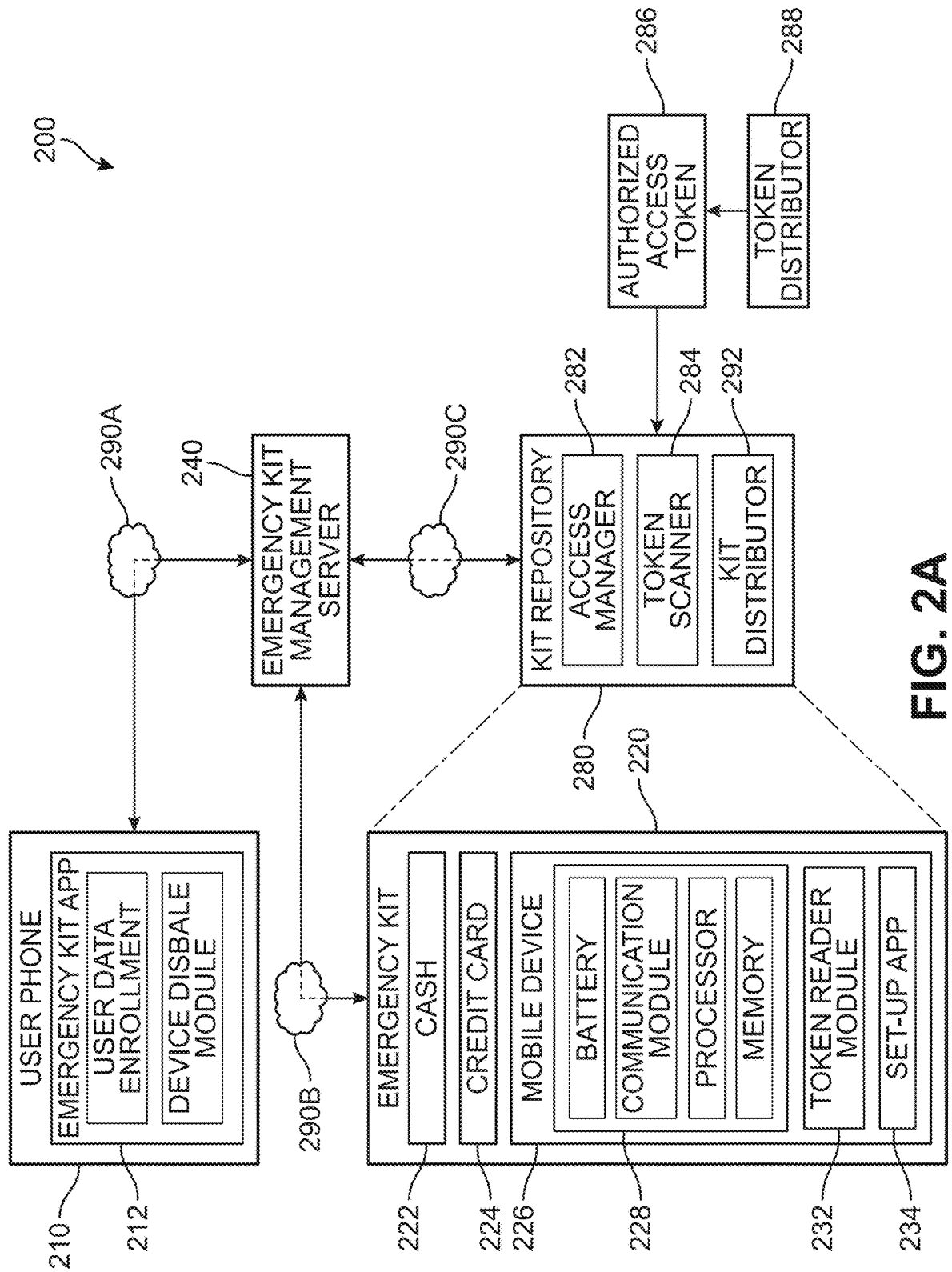
FIGS. 2A and 2B show a schematic diagram of an environment for an emergency resource kit management system, according to an embodiment.
Figure 2B:
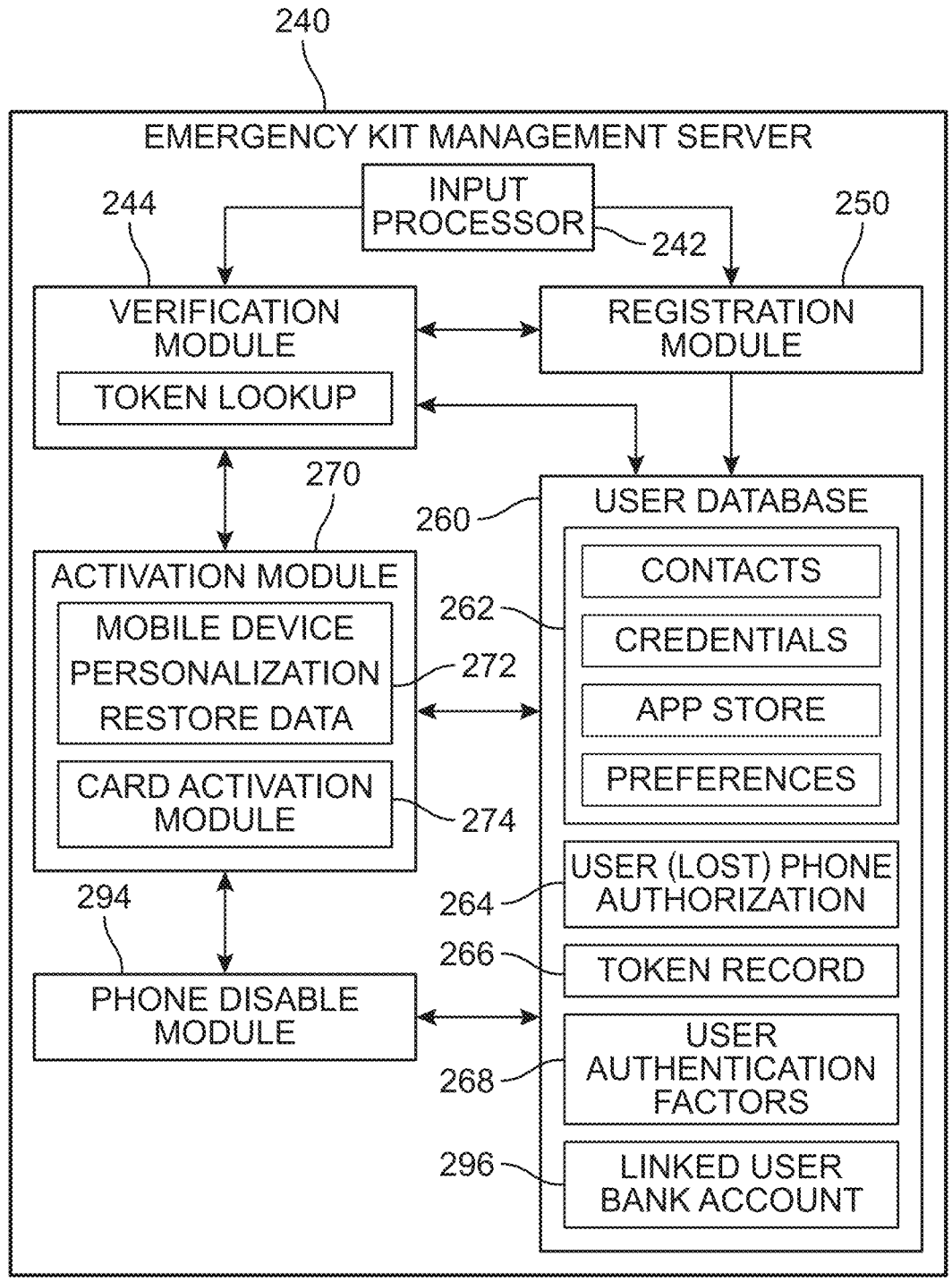

In order to provide the reader with a greater appreciation of the embodiments, FIGS. 2A and 2B depict an embodiment of an environment 200 for implementation of an emergency provisions management system in which user tokens are presented at various locations and used to verify a person's identity for purposes of supplying the user with one or more items. It should be understood that the environment 200 is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIGS. 2A and 2B. In FIG. 2A, the environment 200 includes a remote emergency kit management server ("kit manager") 240 that can be employed by the service provider, and one or more kit repositories ("kit repository") 280 that may be manifested as locker enclosures or storage kiosk secured via an onboard authentication computing system and/or secured on-site by human personnel employing an access management application ("access manager") 282. Kit repository 280 can include one or more emergency kits 220 for deployment to authorized users. It should be understood that the term "computer system" refers to the computing resources of a single computer, the partial computing resources of a single computer, a plurality of computers communicating with one another, or a network of remote servers. In one embodiment, a computer system includes at least one server having at least one processor. Furthermore, in some embodiments, environment 200 can include access to a user phone device ("phone") 210.

In different embodiments, devices and components of environment 200 can communicate with each other and with other components of environment 200 over one or more networks (shown here as networks 290a, 290b, 290c, and collectively referred to as network 290). The network 290 may comprise any number of electronic devices and use any number of communication protocols to facilitate data communications within the network 290. One having skill in the art would appreciate that the network 290 may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password/code or PIN; (b) user possession, typically provided by the secured system service, such as a physical key, smart card, CAC (Common Access Card), PIV card (Personal Identity Verification card), RSA, or other tangible card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments make use of non-tangible factors that include (a) and (c), and can exclude (b), ensuring that the loss of such physical items will not prevent the user from accessing the emergency resource.

Furthermore, authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, kiosks, lockers, vaults, offices, or other spaces with specific security requirements. In addition, the use of the term "secured resources" or "emergency provisions" refers to services, features, or other resources (physical and digital or virtual) that are access-restricted and are designed to be made available only to users that have been authenticated and authorized for such access.

As noted earlier, the proposed systems and methods can be configured to verify a user's identity in order to authorize the supply of cash, credit cards, and/or cellular phone with minimal user effort and offer a simplified, efficient, and ultimately highly convenient process by which to authorize and grant the user access to such essential provisions.

In different embodiments, a user of the proposed systems and methods can be provided with an authorized access token ("token") 286. Token 286 can be obtained from a token distributor 288 such as an authorized seller/retailer, bank/financial institution, government agency, or can be ordered via an online retailer. The tokens may be provided only if authentication of the individual is performed, including presentation of one or more of user knowledge, user possession, and/or user biometrics. In some embodiments, the user may also enroll/select/submit their preferred verification style and information via a registration module 250, such as passwords, security question responses, user data, user phone settings, permissions, payment options, kit preferences, etc. that will be stored in a user database 260 and linked to the token they are given. In one example, a unique token record 266 can be generated and stored in the user database 260 to provide a link between the user's data and their personal token. Once the user has been granted a physical token, they can carry the token on their person (e.g., in a purse, pocket, suitcase, keychain, necklace, bracelet, etc.), or leave the token in their hotel room or other location, particularly in cases where they are traveling away from home. In some cases, they may find they have lost (or had stolen) their cell phone or wallet. In such an event, they can maintain a sense of equanimity, knowing they can seek out the nearest kit repository in the area and have access to essential resources.

Thus, in some embodiments, a user may approach a kit repository location such as a standalone kiosk stationed outside (or inside) a building, or a kit repository managed by their hotel or other authorized personnel. The user can then present the token 286 to a token scanner 284, which can include NFC/Bluetooth® communication technology for reading information stored in the token 286. In another example, the token 286 can include markings such as a bar or QR code or other indicia that can be read by the token scanner 284 and be used to identify the user. Once the user presents the token 286 and it is successfully read by the system, a request for emergency kit 220 can be automatically generated on behalf of the user. In addition, the system can initiate an authentication event session. It should be understood that although the access manager 282 and components thereof are shown as residing entirely on-site at the kit repository, in other embodiments, one or more components of the access manager 282 can be stored at the kit manager 240 or at some other different or remote location.

In different embodiments, the access manager 282 can determine what type of provisions (i.e., what kit items) are approved for the given user, as well as the level of verification needed to proceed. For example, in some embodiments, the access manager 282 can request the user now submit some user knowledge (e.g., phone number, PIN-code, password, preset security question answer) or biometric data that can be used by the system to determine if the identity associated with the token matches the user's verification data. If there is a match, the access manager 282 can approve the release of a specific emergency kit. This approval can be shown to the authorized personnel who can then release one of their kit to the user. In cases where the process occurs at an automated kiosk, the approval is received by a kit distribution module 292, which triggers a release mechanism of a specific locker door. In some embodiments, the access manager 282 communicates via network and works in conjunction with information or instructions provided by the remote kit manager 240, as will be discussed below. The remote kit manager 240 can provide information regarding the type of verification that should be presented, and confirm whether such verification was successful (e.g., at a verification module 244) by reference to user database 260.

Referring now to FIG. 2B, in different embodiments, user inputs can be provided via one or more onboard interface and data collection devices provided at the kit repository 280. In some embodiments, the user-initiated request-based on the detection and scan of the token—is transmitted via access manager 282 over network 290 to the kit manager 240, and can cause a data retrieval response. In different embodiments, the user can be required to then provide an authentication factor 268, which can correspond to a specific biometric data type that will be used as the basis for the authentication, or can correspond to an alphanumeric passcode, or some other security factor known to the user. These access codes can be stored in user database 260. As noted earlier, authentication of a person can be based on one or more types of data. For example, biometric data can be obtained at the kit repository 280 via one or more biometric components installed at or associated with the kit repository 280, including but not limited to devices that are designed to verify a user's identity through unique biological traits such as retinas, irises, voices, facial characteristics, and fingerprints. Thus, the term biometric components can also be referred to as biometric data capture devices or biometric input devices. Biometric authentication systems store this biometric data in association with user database 260 in order to verify a user's identity when that user accesses their account. Because this data is unique to individual users, biometric authentication is often considered more secure than traditional forms of multi-factor authentication. Biometric authentication is a security process that relies on the unique biological characteristics of an individual to verify that he is who he says he is. In different embodiments, biometric identifiers can be acquired and screened through fingerprint scanners, retina and/or iris recognition, voice detection, facial recognition, and/or liveness detection (e.g., when a biometric authentication system verifies that a captured image of a person is indeed that person in the flesh and not a still or flat image).

Alternatively or additionally, a user can submit a passcode or other data that can be used by the system to locate the corresponding record for the purported member. For example, the passcode can include specific sets of numbers that represent personal aspects of a user's life, such as but not limited to one or more of (a) house/business number/address, (b) phone number, (c) PIN number, (d) birthdate, (e) last four digits of their social security number, (f) zip code, (g) child/relative's birthdate, (h) PIN or other account-linked code, (i) unique ID number generated previously for this specific task, (j) the bank account number, etc. If the information matches the record linked to the scanned token the user can be verified and permitted access to the kit. In general, biometric authentication works by comparing two sets of biometric data of the same biometric data type (e.g., retinal scan to another retinal scan, fingerprint to another fingerprint of the same finger, etc.), where the first one is preset by the owner of the device or account, while the second one belongs to a device visitor or person seeking to access the account. A match determination module (not shown) can make a decision, such that if the two sets of data match, the user can be fully authenticated and the kit access granted.

In different embodiments, once authentication is completed successfully, the access manager 282 can proceed by generating an authorization signal that is passed to the kit distributor 292 that can trigger local access by the user to a secured resource supply or kit 220, which can include one or more of cash 222, a credit card 224, and/or SIM card supply and/or a new (blank) cellular mobile computing device ("mobile device") 226 with a SIM pre-loaded. Depending on the availability of the resource in the kiosk, as well as the selections made by the user, one or more of these items can then be released via a central dispenser of the kiosk station or by the opening of a specific locker door from the plurality of lockers at the station that reveals a kit inside. For purposes of this application, a locker kiosk refers to a secured installation in which one or more locked compartments are included. Each kit or item therein can be associated with an identification code that may be automatically assigned/registered to the user's account or record so that the item is now linked to that user for purposes of usage activity/history and purchases made.

As discussed earlier with respect to FIG. 1, in different embodiments, upon gaining access to their kit 220, a user can come into possession one or more items. This description will first describe details regarding the deliverance of the mobile device 226. The mobile device 226 can be understood to include standard cellular phone computing components 228 including but not limited to an onboard rechargeable battery, communication module, processor, and memory. In addition, in different embodiments, each mobile device 226 provided by the service provider can be preconfigured with a token reader module 232 and set-up app 234 for facilitating the automatic transfer of their secure user data to their new phone.

In some embodiments, once a user has the new mobile device 226 in their possession, they can power up the device (if needed, by first charging the device) and the start screen will ask that they bring their token 286 in close proximity to or in contact with the mobile device 226, such as a brief tap or pressing of the token against the mobile device 226. Onboard sensors for the mobile device 226 can automatically pick up the signal using NFC or Bluetooth or other radio frequency protocols-depending on the type of token that was provided—and, in response, the token reader module 232 can trigger a sequence of personalization operations that are based on the user profile/data linked to the presented unique token 286. Furthermore, in some embodiments, in response to detection of the token 286, the set-up app 234 can also be automatically opened on the mobile device 226 with a welcome message and other instructions. In some embodiments, the instructions can guide the user to the nearest location from the retrieval point where a network signal is available. In some embodiments, a network password for a nearby network can also be provided. In other embodiments, the kiosk itself can include or provide a network that is pre-connected to the mobile device 226, or the location where the kiosk is stationed can offer a network, such that if the user powers the device in range of the kiosk or in the building (e.g., bank, library, etc.) where the kit was obtained, the communication module for the device will automatically search and join the local network.

In some embodiments, the information conveyed by the token that is scanned by the mobile device 226 can be used to identify the user and retrieve various user personalization data 262 from the user database 260 over network 290. The token reader module 232 can locate the user's record and share the information with set-up app 234. In some embodiments, the set-up app 234 can be in communication with a activation module 270 of the kit manager 240. In one example, the activation module 270 can determine the token is linked to an account that previously included a request for personalization of the mobile device to occur via a token lookup of the verification module 244, and in response, trigger operation of a mobile device personalization/data restoration module ("data restorer") 272. In another example, the user may opt to trigger operation of the data restorer 272 so by selections made during interactions with the user interface provided by the set-up app 232. The data restorer 272 accesses and configures the user personalization data 262 for use by the set-up app 234, which causes the mobile device 226 to download the various apps, passwords/credentials, contacts, preferences, layout, settings, and other parameters based on the user personalization data 262.

In other words, the set-up app 234 can automatically prepare the mobile device 226 for use by the specific user in such a way so as to make the transition to the new phone seamless and allow the user to quickly take actions that would otherwise not been possible without physical credentials that they may have lost/had stolen. In one example, the user can immediately begin to make phone calls or engage in messaging with their family/friends/colleagues, whose contact information they may not have otherwise have had access to following the loss of their original phone. Similarly, the user can engage in transactions with merchants using stored payment credentials that are now available on the mobile device 226, arrange for travel and other services through apps that have been added and automatically logged in using the user's credentials, which they may not have known by memory. Furthermore, their preferred search engine (and maps) and their email account can also be automatically included so that they can locate important documents or travel information.

In some optional embodiments, the activation of a new mobile device can also serve as a trigger for the kit manager 240 to disable the user's previous device. For example, a user may have opted-in to this security measure by providing a user (lost) phone authorization 264 during their initial enrollment with the service (e.g., selected the option provided by registration module 250). In one example, this authorization 264 can be stored in user database 260. In different embodiments, a signal can be transmitted from the activation module 270 to a phone disable module 262 that indicates activation and set-up of a new phone has been successfully performed. The phone disable module 262 can verify if authorization 264 was provided by the user, and if so, proceed with issuing a disable signal to now-lost user phone 210. In some embodiments, the user had previously installed an emergency kit app 212 on user phone 210, through which they may have enrolled in the emergency kit service, and used to back up and/or update their user personalization data. In some embodiments, a disable signal is sent to the user phone 210 and received by the emergency kit app 212, which includes a device disable module. In different embodiments, the device disable module can be configured to perform one or more of the following operations on the user's old phone: (a) lock the phone; (b) prevent the phone from being powered on; (c) erase the phone memory; (d) take a photo of anyone using the phone and upload it to the kit manager 240; (e) destroy one or more electrical components in the phone; (f) block access to some or all apps on the phone; (g) remove all credentials and passwords; and/or (h) present an alert on the phone indicating the phone is being tracked.

In addition, as noted earlier, in different embodiments, the emergency kit can include provisions for enabling a user's ability to make financial transactions and obtain necessary supplies. For example, kit 220 can further can include credit card 224. In some embodiments, upon receiving credit card 224, the user can call the number on the card using their new mobile device 226 to activate the card. In another example, the credit card 224 is pre-activated and can be used immediately by the user. In some embodiments, the account of credit card 224 can be automatically linked to the user's own account via card activation module 274 in response to an indication from the verification module 244 when the user initially requested access to the kit that the person receiving the kit has that user identity. In some embodiments, the credit card 224 can have a spending limit that is set by the user's initial preferences (during registration with the emergency kit service). In other embodiments, the system can preset the limit of all credit cards to the same limit. Furthermore, kit 220 can also provide user with an amount of cash 224 that is pre-deposited into the kit 220. The user can select the amount they would like in some cases, and the kiosk can automatically release the selected amount of cash. This amount can be automatically debited from a bank account 286 linked to the user's identity provided by the user during their enrollment.

Figure 3:
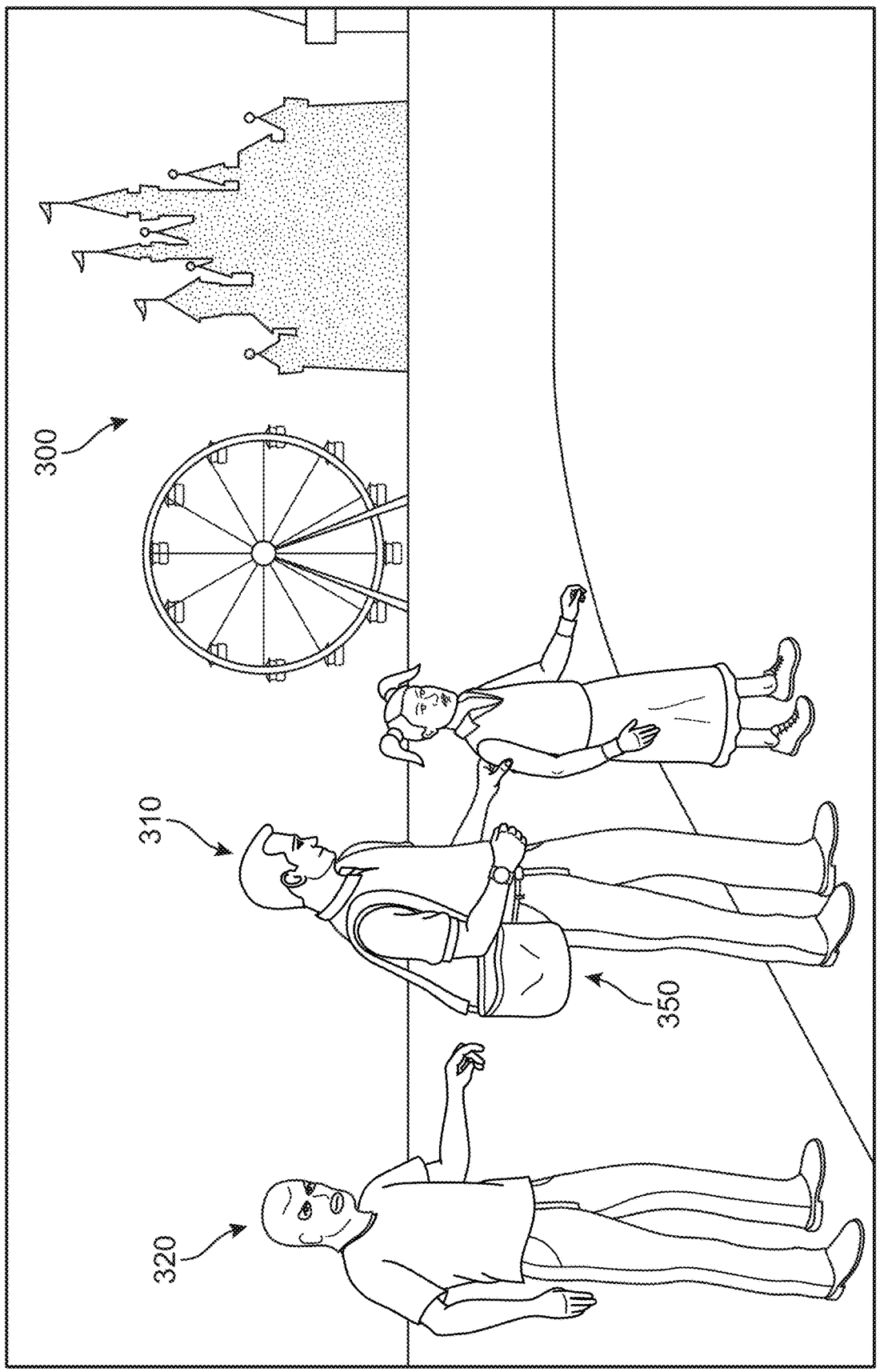
FIG. 3 is a representation of a person being robbed of their valuables, according to an embodiment.
Figure 4:
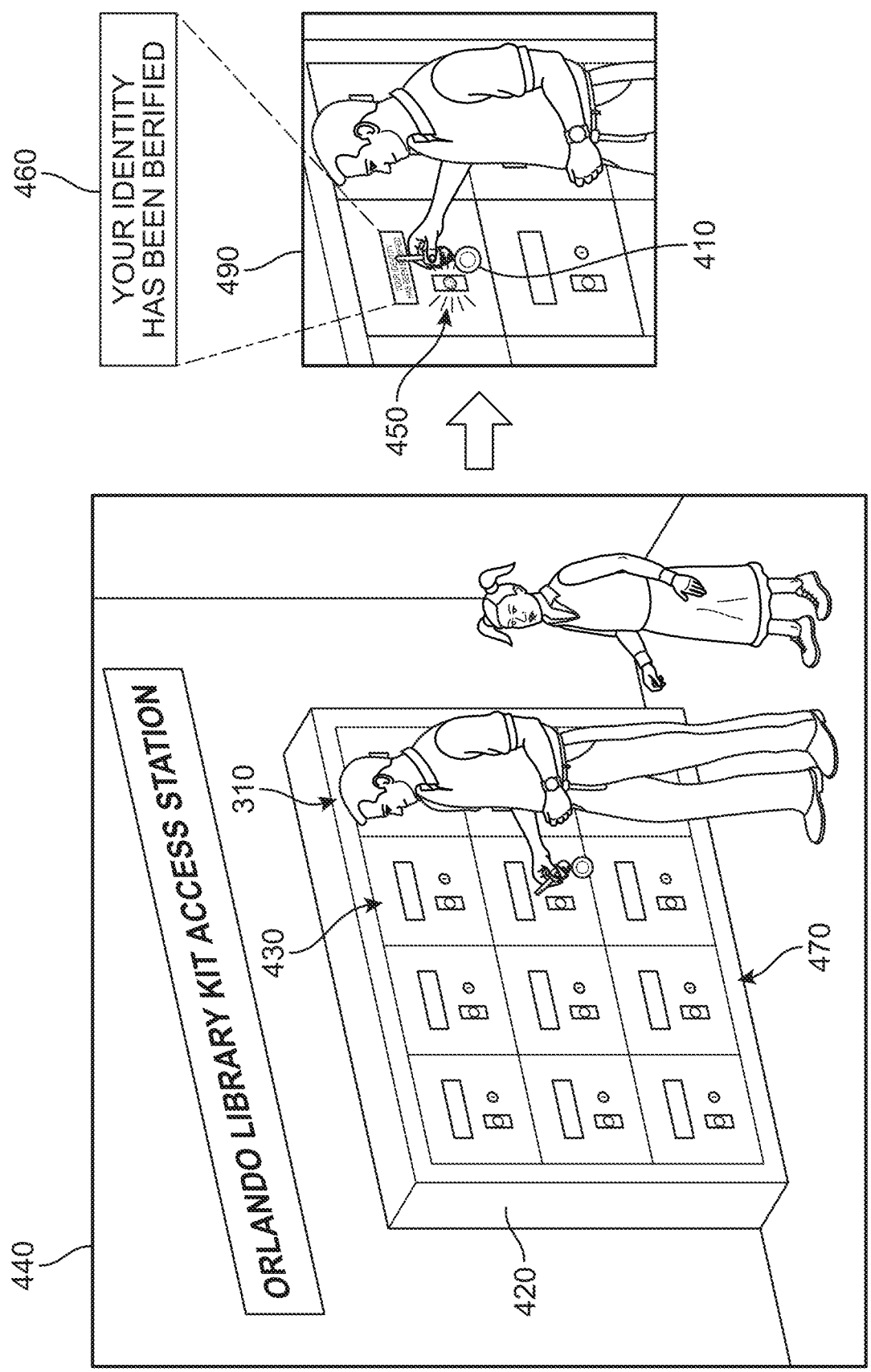
FIG. 4 depicts the person approaching a locker kiosk and presenting their token, according to an embodiment.

FIGS. 3-7B present a sequence of drawings illustrating a scenario in which an embodiment of the proposed systems is implemented. In FIG. 3, a user 350 is traveling as a tourist with his daughter 330 in a foreign city 300. During an outing, the user 310 is pickpocketed, thereby losing his wallet 350 (cash, credit cards, ID cards, etc.) and phone. Moving to FIG. 4, the user 310, having suffered this loss while traveling away from home, locates a nearby kiosk 420 at a local public library 440 which includes a plurality of lockers 470. In different embodiments, kiosk 420 may comprise an enclosure along with various components and resources that provide authorization services for users. In some cases, kiosk 420 could be a stand-alone structure. In other cases, kiosk 420 could be part of a larger building or other structure. The enclosure may provide systems to facilitate banking or other secured-resource transactions. As seen in FIG. 4, an exterior of the enclosure may include an access portal 430 to the kiosk computing system and components thereof.

In this example, a user interface is provided at the access portal 430, for example include a welcome message shown on a display of the kiosk 420. As shown in magnified view 490, the user 310 presents their tracking device token ("token") 410 to a scanner device 450 connected to the computing system at the kiosk 420. In response, the computing system can read user-specific information stored on the token 410. In one embodiment, information related to or identifying the token 410 can be communicated to the remote kit management server. In different embodiments, the kiosk 420 may communicate (via its computing system) with a server via a network. The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols. In some embodiments, the kiosk 420 can be connected to the network through a hardwire connection or wirelessly. Similarly, the server can be connected to a network via a hardwire connection or wirelessly. The server can be used to manage the activity of kiosk 420 and/or to send and receive information to and from kiosk 420. In many cases, the kiosk 420 s designed to be unmanned and/or operated remotely. Thus, kiosk 420 may be potentially operational at any time, and can host interactive sessions 24 hours per day, 7 days a week. In some embodiments, the user interface can also include a keypad by which a user can enter information (this may also or alternatively be provided by a touchscreen interface of the display screen), and a dispenser (e.g., for cash or credit card release).

Figure 5:
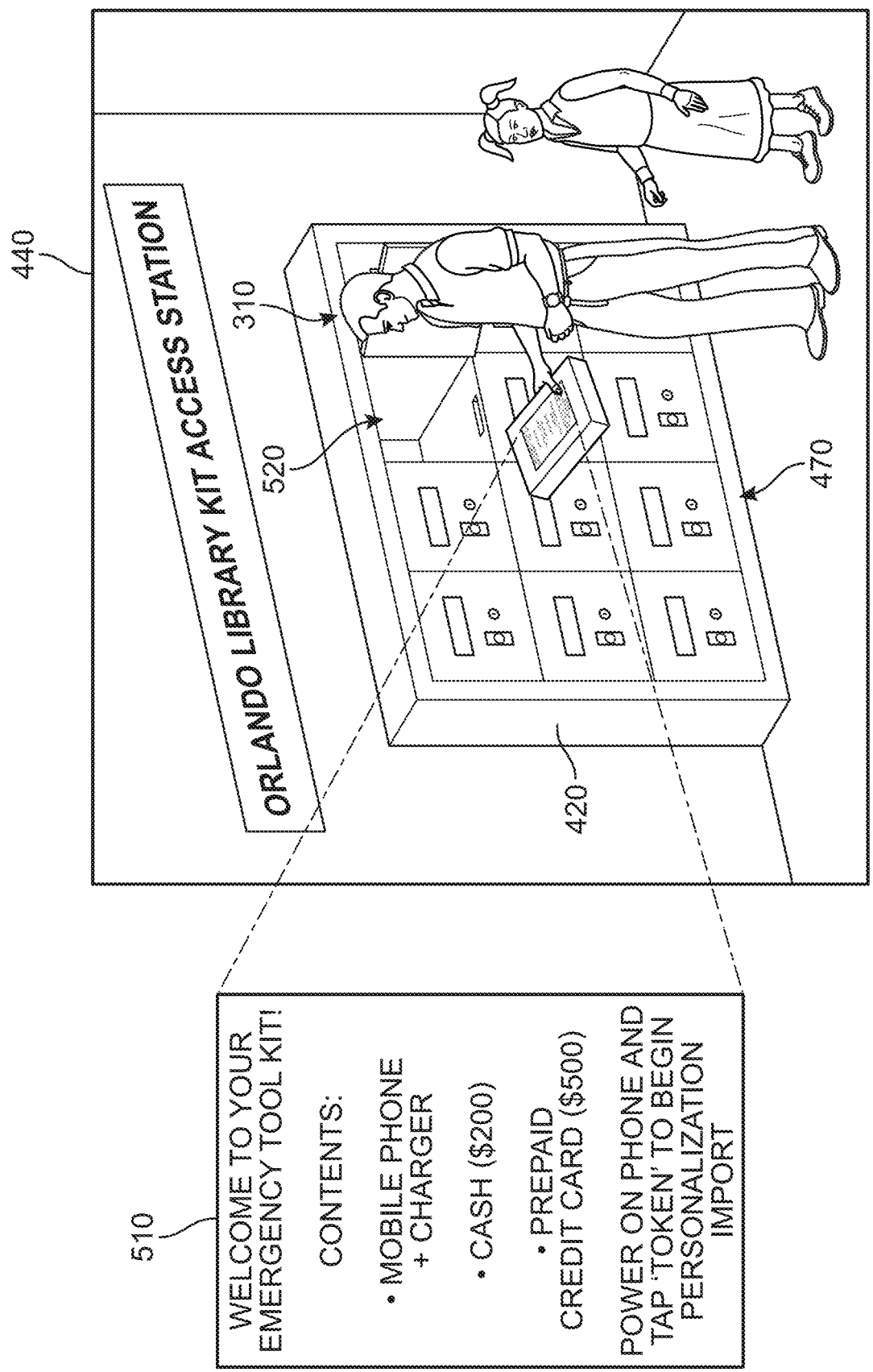
FIG. 5 depicts an example of the token being used to cause the dispensing of one or more secured resources including a replacement phone, according to an embodiment.

Referring next to FIG. 5, once the token is successfully detected and verified by the kiosk 420, the kiosk 420 can be configured to automatically release an emergency kit 530 to the user. In this example, a first locker 520 of the plurality of lockers 470 is automatically opened/unlocked. An instruction booklet 510 is optionally provided, listing the items that are being transferred to the user 310, and the first step in activating their new phone. Thus, the user 310, who had lost their ID and phone is now in possession of a new phone, credit card, and some cash in the currency of the country they are in.

Figure 6:
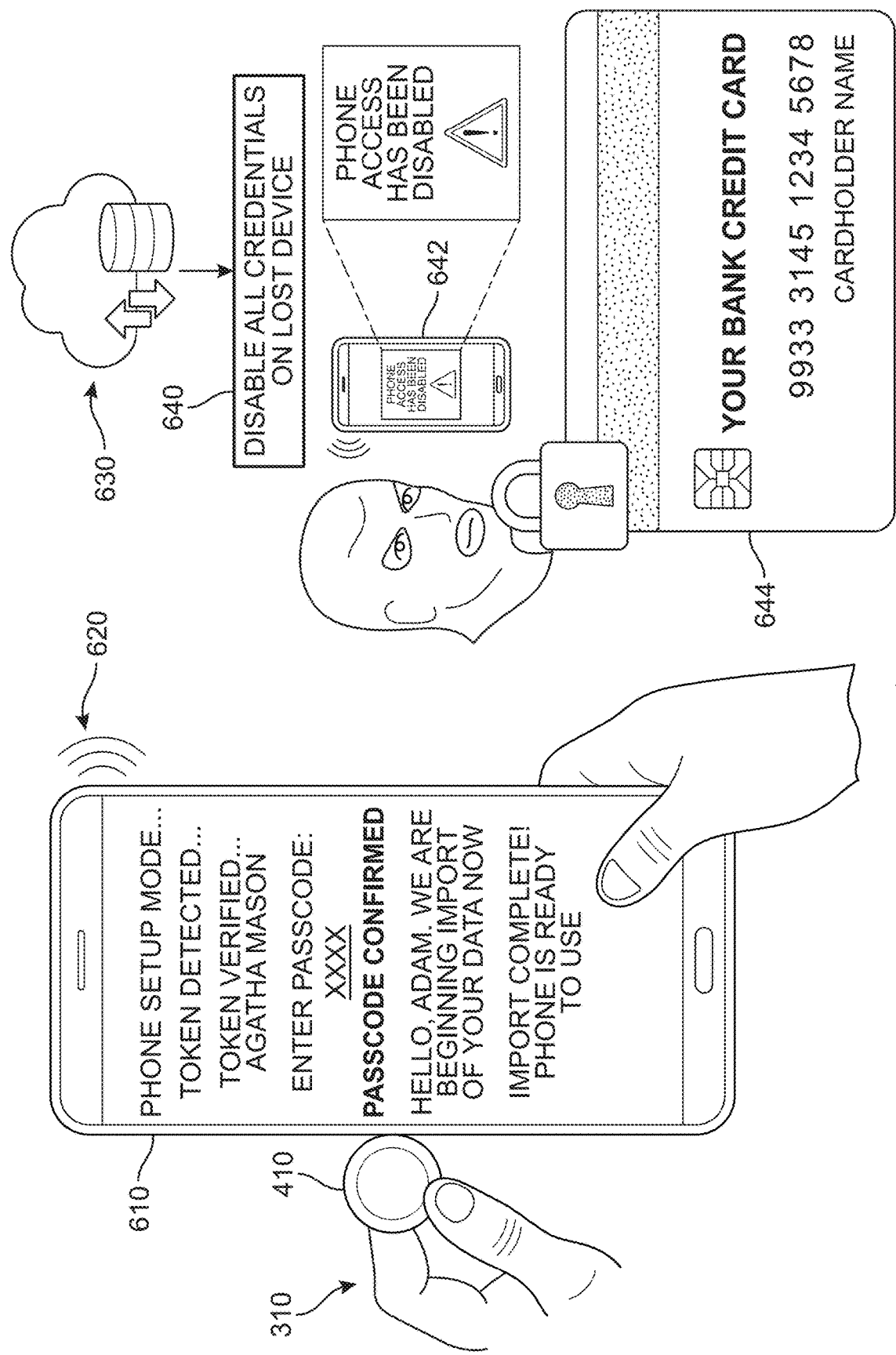
FIG. 6 illustrates a personalization process being performed at the replacement phone and a disablement process being performed at the user's previous phone, according to an embodiment.

Once the user 310 is in possession of the items, they can initiate a personalization process for the new mobile device. In FIG. 6, the user 310 is depicted tapping the token 410 against a side of a replacement phone 610 provided by the kiosk. It can be understood that the replacement phone 610 was charged and powered on before this exchange of data occurred. In response to the token's presence, the replacement phone 610 enters a setup mode, as indicated on a display 650 of the replacement phone 610, and joins network 620. In different embodiments, a set-up app 660 running on the phone 610 can automatically begin the personalization process (set-up mode) by importing the user's data from remote server 630. In one example, the user 310 can be prompted to provide an additional verification code before importation is performed. Once the user data is retrieved, the phone can be updated to sync with the user's previously designated settings, apps, and configurations. In some embodiments, user data can also include backed up photos, videos, documents emails, and other personal files, now accessible to them via the replacement phone 610.

As noted earlier, in some embodiments, the activation of the phone 610 can also trigger the disabling of the user's previous phone. This is depicted in FIG. 6, where the remote server 630 transmits a signal 640 to the user's ex-phone 642, causing the ex-phone to be disabled or otherwise restricted or blocked. Furthermore, in some embodiments, the activation of the phone 610 can trigger the automatic deactivation or locking of any user credit cards 644 that were listed in the user's account.

Figure 7A:
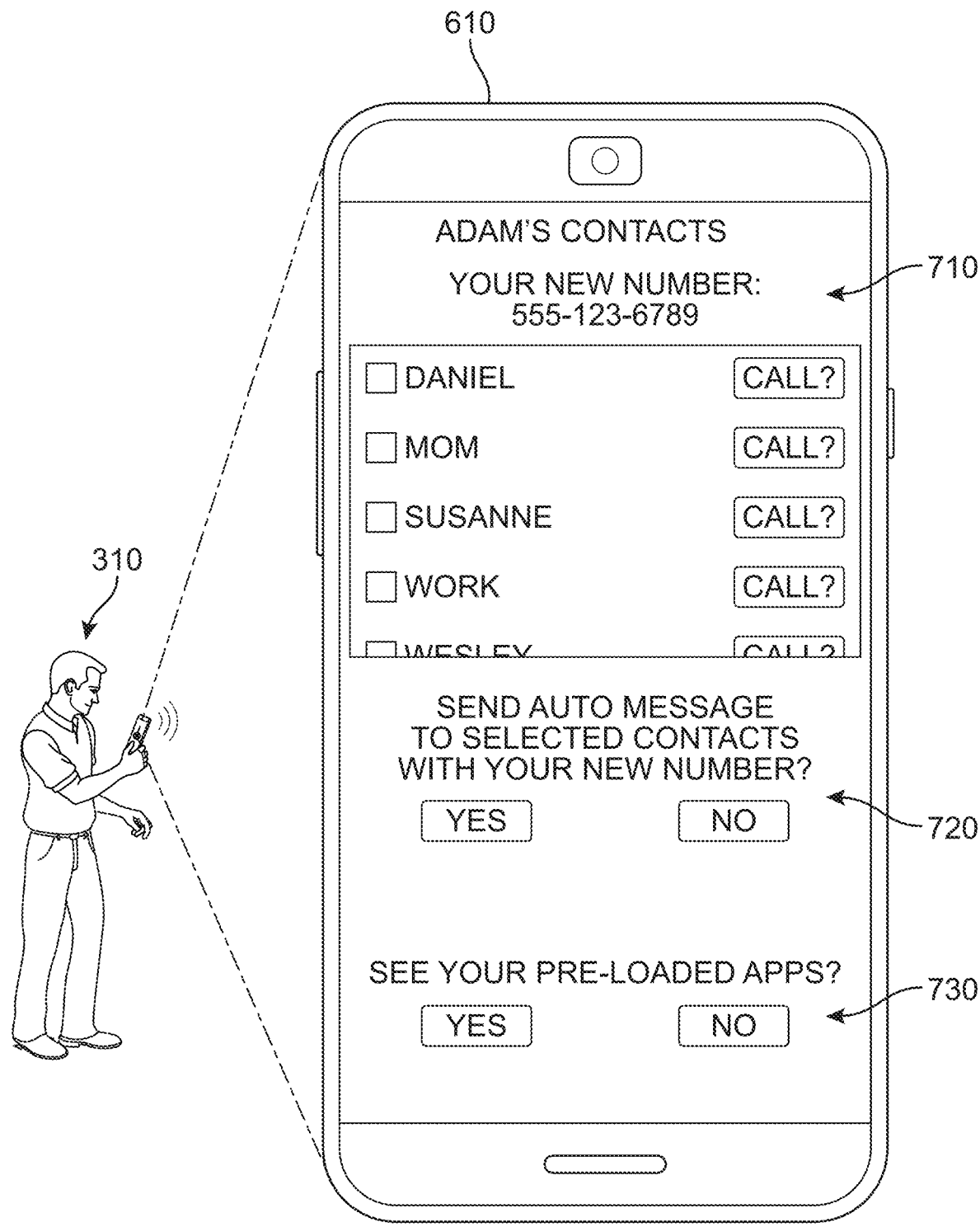
FIGS. 7A and 7B depict examples of some features provided by the replacement phone following the personalization process, according to an embodiment.
Figure 7B:
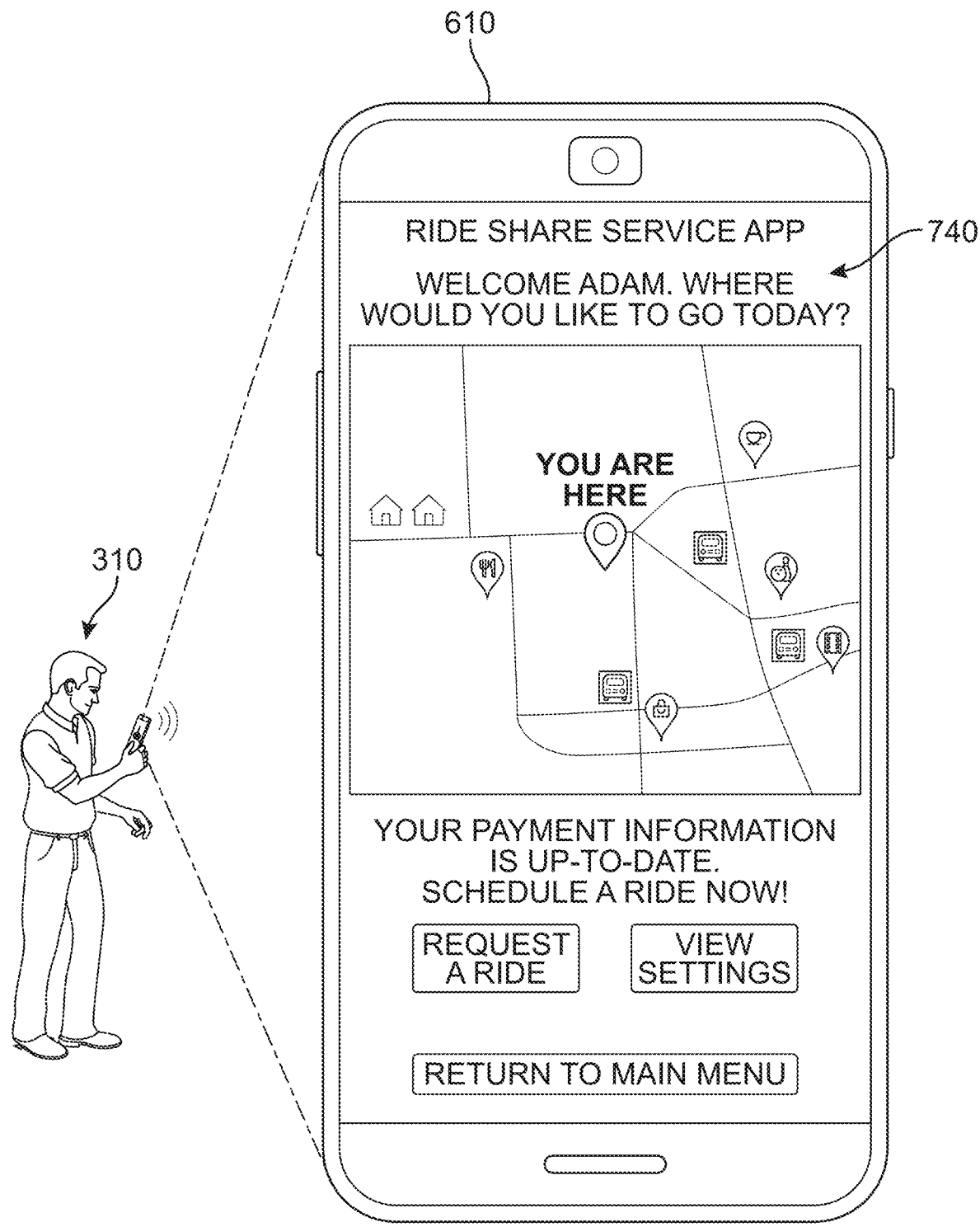

Referring now to FIGS. 7A and 7B, an illustration of some of the benefits of the proposed embodiments are shown. In FIGS. 7A and 7B, the user 310 is shown interacting with their new (replacement) phone 610 following successful completion of the personalization process described above. For example, in FIG. 7A, the user 310 is viewing their contacts 710 which they would otherwise have been unable to connect with, at least not while traveling away from home. In addition, in some embodiments, the phone 610 can offer a quick-message option 720 that allows the user 310 to send a message to all selected contacts describing the loss of their previous phone and the new number at which they can be reached. In another example, a quick-view option 730 can allow the user 310 to view all of the apps that have been automatically downloaded for their use on the new phone 610. One example of the advantage of such an arrangement is depicted in FIG. 7B, where the user 310 is shown interacting with a ride-share app 740. Even if the user does not obtain any other of valuable items (credit card, cash), they can simply open the ride-share app 740 for which they are already a registered user and request services to continue to travel without delay.

Figure 8:
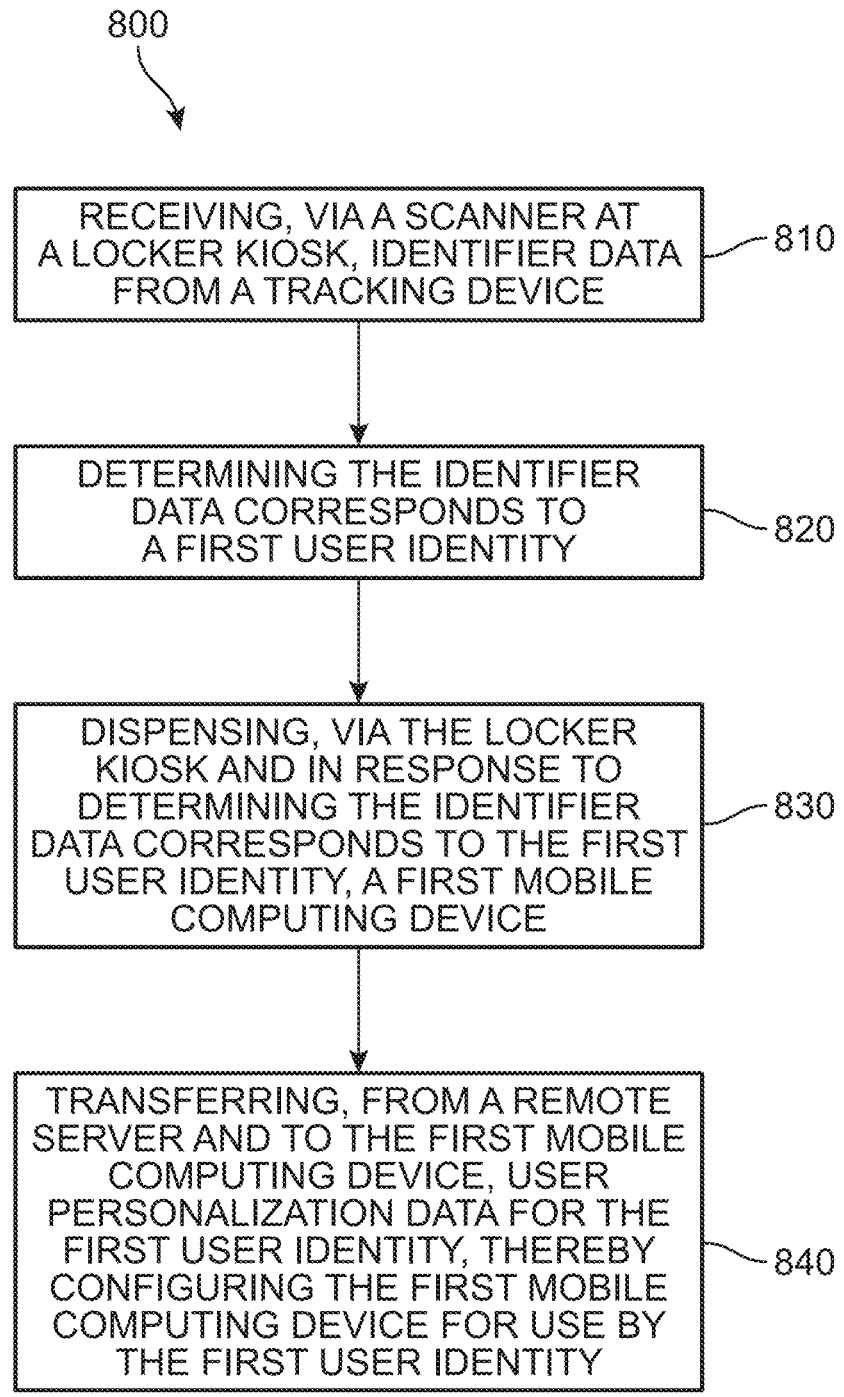
FIG. 8 is a flow chart depicting a process of providing emergency access to a secured resource, according to an embodiment.

FIG. 8 is a flow chart illustrating an embodiment of a computer-implemented method 800 of providing emergency access to a secured resource. The method 800 includes a first step 810 of receiving at a first time, via a scanner at a locker kiosk, identifier data from a tracking device and a second step 820 of determining, at an access manager module, the identifier data corresponds to a first user identity. In addition, a third step 830 includes dispensing, via the locker kiosk and in response to determining the identifier data corresponds to the first user identity, a first mobile computing device. The method 800 also includes a fourth step 840 of automatically transmitting and transferring over a network, from a remote server and to the first mobile computing device, and in response to dispensing the first mobile computing device, user personalization data for (linked to) the first user identity, thereby configuring the first mobile computing device for use by the first user identity.

In other embodiments, the method may include additional steps or aspects. In one embodiment, the method also includes receiving, during an enrollment process at a second time prior to the first time, the user personalization data from a first user, the first user having the first user identity; and storing the user personalization data in an account for (linked to) the first user. In one example, the method can then also include providing, to the first user, the tracking device; and linking the identifier data for the tracking device with the account.

In some embodiments, the method also includes steps of receiving, at the locker kiosk, a first authentication factor; and verifying, at the access manager module, that the first authentication factor matches a second authentication factor linked to the first user identity, where dispensing the first mobile computing device is further in response to verifying the first authentication factor matches the second authentication factor. In another example, the method also includes automatically transmitting, in response to dispensing the first mobile computing device, a signal to a second mobile computing device, the signal disabling the second mobile computing device. In one embodiment, the method can include dispensing, via the locker kiosk and in response to determining the identifier data corresponds to the first user identity, a credit card.

In another example, the method includes dispensing, via the locker kiosk and in response to determining the identifier data corresponds to the first user identity, a first amount of cash in the currency of the country in which the locker kiosk is located. In some embodiments, the transfer of the user personalization data occurs or is triggered in response to receiving the identifier data at the first mobile computing device. In different embodiments, the locker kiosk is stationed in one of a hotel, library, bank, and government agency. In some embodiments, the method also includes dispensing, via the locker kiosk and in response to determining the identifier data corresponds to the first user identity, credentials for connecting the first mobile computing device to a local network. In another example, the method includes dispensing, via the locker kiosk and in response to determining the identifier data corresponds to the first user identity, a power charging cable for the first mobile computing device Other methods can also be contemplated within the scope of this disclosure. For example, a computer-implemented method of providing emergency access to a secured resource can include a first step of receiving, via a scanner at a locker kiosk, identifier data from a tracking device, and a second step of determining, at an access manager module, the identifier data corresponds to a first user identity. The method can also include a third step of receiving, at the locker kiosk, a first authentication factor, and a fourth step of verifying, at the access manager module, that the first authentication factor matches a second authentication factor linked to the first user identity. A fifth step can include dispensing, via the locker kiosk and in response to determining the identifier data corresponds to the first user identity and the first authentication factor matches the second authentication factor, a first mobile computing device.

In other embodiments, the method may include additional steps or aspects. In one embodiment, the method also includes automatically transferring, over a network, from a remote server and to the first mobile computing device, and in response to dispensing the first mobile computing device, user personalization data for the first user identity, thereby configuring the first mobile computing device for use by the first user identity. In another example, configuring the first mobile computing device for use by the first user identity includes importing user contacts to the first mobile computing device. In some embodiments, configuring the first mobile computing device for use by the first user identity includes importing user credentials for one or more app accounts associated with the first user identity to the first mobile computing device.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random-access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both.

In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LAN (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random-access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing emergency access to a secured resource, the method comprising:
   receiving at a first time, via a scanner at a locker kiosk, identifier data from a tracking device;
   determining, at an access manager module, the identifier data corresponds to a first user identity;
   dispensing, via the locker kiosk and in response to determining the identifier data corresponds to the first user identity, a first mobile computing device; and
   automatically transferring over a network, from a remote server and to the first mobile computing device, and in response to dispensing the first mobile computing device, user personalization data for the first user identity, thereby configuring the first mobile computing device for use by the first user identity.

2. The method of claim 1, further comprising:
   receiving, during an enrollment process at a second time prior to the first time, the user personalization data from a first user, the first user having the first user identity; and
   storing the user personalization data in an account for the first user.

3. The method of claim 2, further comprising:
   providing, to the first user, the tracking device; and
   linking the identifier data for the tracking device with the account.

4. The method of claim 1, further comprising:
   receiving, at the locker kiosk, a first authentication factor; and
   verifying, at the access manager module, that the first authentication factor matches a second authentication factor linked to the first user identity,
   wherein dispensing the first mobile computing device is further in response to verifying the first authentication factor matches the second authentication factor.

5. The method of claim 1, further comprising automatically transmitting, in response to dispensing the first mobile computing device, a signal to a second mobile computing device, the signal disabling the second mobile computing device.

6. The method of claim 1, further comprising dispensing, via the locker kiosk and in response to determining the identifier data corresponds to the first user identity, a credit card.

7. The method of claim 1, further comprising dispensing, via the locker kiosk and in response to determining the identifier data corresponds to the first user identity, a first amount of cash in the currency of the country in which the locker kiosk is located.

8. The method of claim 1, wherein the transfer of the user personalization data occurs in response to receiving the identifier data at the first mobile computing device.

9. The method of claim 1, wherein the locker kiosk is stationed in one of a hotel, library, bank, and government agency.

10. The method of claim 1, further comprising dispensing, via the locker kiosk and in response to determining the identifier data corresponds to the first user identity, credentials for connecting the first mobile computing device to a local network.

11. The method of claim 1, further comprising dispensing, via the locker kiosk and in response to determining the identifier data corresponds to the first user identity, a power charging cable for the first mobile computing device.

12. A method for providing emergency access to a secured resource, the method comprising:
   receiving, via a scanner at a locker kiosk, identifier data from a tracking device;
   determining, at an access manager module, the identifier data corresponds to a first user identity;
   receiving, at the locker kiosk, a first authentication factor;

verifying, at the access manager module, that the first authentication factor matches a second authentication factor linked to the first user identity; and dispensing, via the locker kiosk and in response to determining the identifier data corresponds to the first user identity and the first authentication factor matches the second authentication factor, a first mobile computing device.

13. The method of claim 12, further comprising automatically transferring over a network, from a remote server and to the first mobile computing device, and in response to dispensing the first mobile computing device, user personalization data for the first user identity, thereby configuring the first mobile computing device for use by the first user identity.

14. The method of claim 13, wherein configuring the first mobile computing device for use by the first user identity includes importing user contacts to the first mobile computing device.

15. The method of claim 13, wherein configuring the first mobile computing device for use by the first user identity includes importing user credentials for one or more app accounts associated with the first user identity to the first mobile computing device.

16. A system for providing emergency access to a secured resource, the system comprising a processor and machine-readable media including instructions which, when executed by the processor, cause the processor to:

receive, via a scanner at a locker kiosk, identifier data from a tracking device;

determine, at an access manager module, the identifier data corresponds to a first user identity;

dispense, via the locker kiosk and in response to determining the identifier data corresponds to the first user identity, a first mobile computing device; and automatically transfer over a network, from a remote server and to the first mobile computing device, and in response to dispensing the first mobile computing device, user personalization data for the first user identity, thereby configuring the first mobile computing device for use by the first user identity.

17. The system of claim 16, wherein the instructions further cause the processor to receive, at the locker kiosk, a first authentication factor; and verify, at the access manager module, that the first authentication factor matches a second authentication factor linked to the first user identity, wherein dispensing the first mobile computing device is further in response to verifying the first authentication factor matches the second authentication factor.

18. The system of claim 16, wherein the instructions further cause the processor to automatically transmit, in response to dispensing the first mobile computing device, a signal to a second mobile computing device, the signal disabling the second mobile computing device.

19. The system of claim 16, wherein the instructions further cause the processor to dispense, via the locker kiosk and in response to determining the identifier data corresponds to the first user identity, a credit card.

20. The system of claim 16, wherein the transfer of the user personalization data occurs in response to receiving the identifier data at the first mobile computing device.

* * * * *